United States Patent Office 3,335,139
Patented Aug. 8, 1967

3,335,139
METHOD OF PREPARING CARBAMATES
Thomas W. Martinek, Crystal Lake, and Donald L. Klass, Barrington, Ill., assignors, by mesne assignments, to The Union Oil Company of California, Los Angeles, Calif., a corporation of California
No Drawing. Filed July 30, 1964, Ser. No. 386,381
5 Claims. (Cl. 260—247.2)

This invention relates to a simple and economical method for preparing glycol bis-carbamates which are useful as organic intermediates.

In accordance with this invention the discovery has been made that simple slow distillation to remove alcohol from heated, evacuated hydroxy alkyl carbamates results in esterification of the free hydroxyl group with carbamic acid. Although the mechanism for the reaction is not understood it is surmised to be through an ester interchange reaction with release of the free polyhydric alcohol. The reaction of this invention can be employed to produce a variety of polycarbamic acid esters of polyhydric alcohols.

Specifically the reaction of hydroxyalkyl carbamates results in the esterification of the free hydroxyl group with carbamic acid probably through an ester interchange reaction with release of the free polyhydric alcohol. This is illustrated by the following reaction wherein R and $R^1$ are as hereinafter defined:

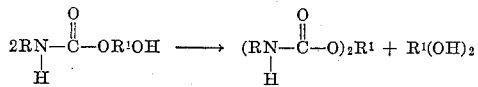

The temperature and pressure of the reaction are determined principally by the volatility of the alcohol released, the temperature being above the boiling temperature of the alcohol at reaction pressure and below the thermal decomposition point of the carbamate.

R and $R^1$ can be the same or different radicals of alkyl, alkylaryl, aryl, cycloaliphatic and alkylcycloaliphatic character having up to 80 carbon atoms. Preferably R and/or $R^1$ are $C_1$ to $C_{20}$ alkyl or alkylene, $C_6$ to $C_{14}$ aryl or arylene, that is having 6 to 14 cyclic carbon atoms, $C_1$ to $C_{20}$ alkyl-substituted aryl or arylene having 6 to 14 cyclic carbon atoms, aralkyl or aralylene having 6 to 14 carbon atoms in the cyclic portion and 1 to 20 carbon atoms in the alkyl or alkylene portion, $C_3$ to $C_7$ cycloalkyl or cycloalkylene and $C_1$ to $C_{20}$ alkyl-substituted cycloalkyl or cycloalkylene radicals, or heterocyclic radicals having 1 to 2 hetero-atoms (O or N or both) in a 5–10 membered heterocyclic ring or condensed rings.

Examples of R and $R^1$ groups are methyl (or methylene), ethyl (or ethylene), propyl, isopropyl, butyl, isobutyl, t-butyl, amyl, isoamyl, cyclopropyl, cyclobutyl, cyclopentyl, cyclohexyl, cycloheptyl, phenyl, benzyl, tolyl, xylyl, xylylene, phenylene, cyanomethyl, cyanoethyl, cyanopropyl, cyanobutyl, cyanoisobutyl, cyanoamyl, cyanoisoamyl, methoxymethyl, methoxyethyl, methoxyethylene, methoxybutyl, methoxyamyl, methoxyamylene, methoxyisopropyl, acetamidobutyl, acetamidoisobutyl, acetamidoisopropyl, carboethoxyethyl, carboethoxypropyl, carboethoxyisopropyl, carboethoxybutyl and carboethoxyamyl. Additional specific substituent groups include naphthyl, anthryl, nitrophenyl, e.g., 4-nitrophenyl, cyanophenyl, e.g., 4-cyanophenyl, morpholino, pyridyl, piperidino, fluorophenyl, e.g., 3-fluorophenyl and the like.

Accordingly, a primary object of this invention is to provide an economical and simple method of preparing esters of carbamic acid.

Another object of this invention is to provide a method of preparing glycol bis-carbamates.

An object of this invention is to provide a method of preparing polycarbamic acid esters of polyhydric alcohols.

Still another object of this invention is to provide a process of producing esters of carbamic acid by slow distillation and ester interchange reaction.

A further object of this invention is to provide a method of preparing glycol-bis(N-benzylcarbamate) from 2-hydroxyethyl-N-benzylcarbamate.

A particular object and feature of this invention is to provide a method of preparing pure ethylene glycol-bis (N-benzylcarbamate) having the formula

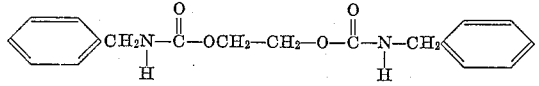

In order to demonstrate the invention, and purely by way of illustration without limitation as to the scope of this invention, the following examples are given.

Example I

A 769 gm. portion of 2-hydroxyethyl-N-benzylcarbamate, prepared by the slow reaction of stoichiometric amounts of ethylene carbonate and N-benzylamine, in accordance with the equation:

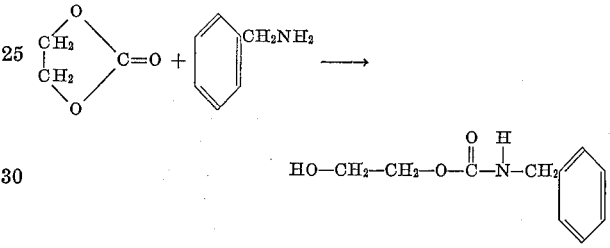

and approximately 1.0% ethylene carbonate, which is not essential to the reaction, were heated in a typical laboratory vacuum distillation apparatus at a pot temperature of 125–170° C. and a pressure of 0.3 to 1.0 mm. for an extended period of time. Nine fractions boiling from 61° to 76° C. and constituting 25% of the total weight of product charged were collected. Refractive index and density indicated the overhead distillate was predominantly ethylene glycol with a major impurity of ethylene carbonate. Decomposition began to occur at a pot temperature of 170–175° C. as indicated by fuming and pressure rise. The residue was a light amber liquid which solidified at about 140° C. Recrystallization from hot methanol or ethanol yielded nearly pure glycol bis(N-benzylcarbamate), M.P. 151–152° C. Calculated percent C,H,N, and molecular weight=65.8, 6.14, 8.53 and 328 respectively; found 66–66.2, 6.3–7.0, 8.9–9.8 and 320 respectively. Infrared adsorption substantiated the presence of the carbamate structure.

The product has the structure:

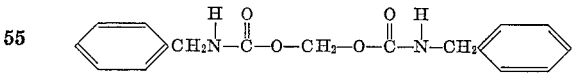

Example II

A 93.1 g. (0.4774 mol. portion of pure N-benzyl-2-hydroxy-ethyl carbamate (M.P. 43–45° C.) was charged to a 250 ml., 3-neck flask equipped with a thermometer, inert gas inlet and Vigreaux column to which was attached a vacuum takeoff head. The pure carbamate was held at a pot temperature of 140–170° C. and a pressure of about 0.5 mm. Hg for a total of 52 hours. Within 4 hours, an overhead temperature of 60–70° C. was established, indicating separation of ethylene glycol from the mixture. Within 48 hours, four fractions of impure glycol, totaling 9.6 gms. (65%), had collected. The reaction was discontinued and the solid pot residue was extracted with successive portions of hot methanol. The methanol extract was cooled and the solid precipitate filtered to yield 46.6 g. (60%) of pure glycol bis(N-benzyl-carbamate), M.P. 149.5–151.5° C., identical to that obtained from the experiment of Example I above.

*Example III*

A 139 gm. portion of pure N-methyl-2-hydroxypropyl-carbamate is heated at a pot temperature of 120–140° C. and a pressure (nitrogen atmosphere) of 1.5–2.0 mm. for an extended period of time. Approximately 30 gms. of impure 1,2-dihydroxypropane is slowly collected overhead. The residue is cooled, dissolved in hot methanol or ethanol and precipitated by further cooling. The white solid is recovered by filtration and by chemical analysis is found to be nearly pure propylene glycol-bis(N-methylcarbamate).

*Example IV*

A 175 gm. portion of N-morpholino-2-hydroxyethyl-carbamate is heated at a pot temperature of 120–150° C. and a pressure of 0.5–2.0 mm. Hg for an extended period of time. Approximately 28 grams of material boiling at 60–80° C. is slowly taken overhead. The residue is cooled, dissolved in hot methanol or ethanol and precipitated as a while solid by cooling the solution. Analysis indicates the product to be nearly pure glycol bis(N-morpholinocarbamate).

*Example V*

In another experiment, 26 grams of butylcarbamate and 6.62 grams of ethylene glycol were mixed and heated at 150–155° C. for 72 hours. No reflux and no apparent change in the mixture over the entire period was observed. These results show that an ester-interchange type of reaction does not occur, at least with unsubstituted carbamates, since no butyl alcohol was liberated during the entire heating period.

*Example VI*

To demonstrate whether or not N-substituted hydroxy carbamate would exchange with higher boiling alcohols, a 68.6 gram portion of 2-hydroxyethyl-N-benzylcarbamate was heated at about 0.5 mm. Hg with 10.8 grams of glycerine. At a pot temperature of 138° C., reflux occurred with an overhead temperature of 114° C. Overhead temperature gradually decreased with time so that, after 95 hours, overhead temperature was only 78° C., indicating that ethylene glycol was separating from the reaction mixture. Overhead product totaling 15 grams was collected over a 48 hour period with the pot temperature ranging from 134 to 179° C. and the overhead temperature ranging from 78 to 146° C. The residue in the flask was a white solid from which pure ethylene glycol bis-N-benzylcarbamate, M.P. 152–152.5° C., was isolated. Fractional distillation of the overhead products showed that glycerine and glycol were the major products. Apparently the glycerine did not react but was recovered while the 2-hydroxyethyl N-benzylcarbamate underwent condensation to the biscarbamate and ethylene glycol.

Species of carbamate esters that can be prepared in accordance with this invention include Methylene glycol-bis(N-methylcarbamate)
Methylene glycol-bis(N-ethylcarbamate)
Methylene glycol-bis(N-propylcarbamate)
Methylene glycol-bis(N,N.-dipropylcarbamate)
Ethylene glycol-bis(N-methylcarbamate)
Ethylene glycol-bis(N-morpholinocarbamate)
Ethylene glycol-bis(N,N.-3 chlorophenylcarbamate)
Ethylene glycol-bis(N-eicosylcarbamate)
Propylene glycol bis(N-decylcarbamate)
Propylene glycol-bis(N-naphthylcarbamate)
Propylene glycol-bis(N-anthracylcarbamate)
Propylene glycol-bis(N,N-diamylcarbamate)
Butylene glycol-bis(N-cyanoethylcarbamate)

The reactions involved in the process of this invention differ from conventional ester interchange reactions in that carbamic acid esters are interchanged and the exchange occurs within two molecules of a partial ester rather than directly between a free alcohol and another ester. This specificity of ester interchange is unexpected with carbamic acid esters because of the inherent instability of carbamic acids. Also, the thermal decomposition of carbamic acid esters normally leads to disubstituted ureas.

Accordingly, the process of this invention encompasses the slow heating or vacuum distillation of any hydroxy substituted alkyl-N-organo-carbamate at a temperature below its thermal decomposition point and above the boiling point of the alcohol released in the reaction at the pressure under which the reaction is conducted. This temperature and also the pressure or vacuum applied is governed by the characteristics of the ester and the alcohol. At pressures in the order of 0.2 to 20 mm. of Hg, temperatures of about 110° to 180° C. are satisfactory for producing a majority of the glycol bis-carbamates disclosed herein. Since the temperature used is a function of the pressure (or vacuum) applied and the thermal decomposition temperature of the carbamates being treated, same is not a limiting factor in the process of this invention. One skilled in the art can readily ascertain by conducting simple tests and observing the distillation whether the correct amount of heat is applied.

No particular difficulty is experienced in carrying out the process of this invention. Preferred species prepared in accordance with this invention are disclosed herein and in the examples which constitute the best mode of carrying out the invention. One advantage of the process of this invention is the fact that the glycol bis-carbamates so produced have a high degree of purity and do not require further purification for most uses.

The glycol-bis esters of this invention have utility as ingredients in coating compositions, as selective solvents for aromatic hydrocarbons and as ingredients in paint compositions.

The embodiments of the invention in which an exclusive property or privilege is claimed are defined as follows:

1. A process of preparing glycol bis-carbamates which comprises heating an ester of the formula

RNHCO$_2$R'OH wherein R is a radical selected from (a) C$_1$ to C$_6$ alkyl (b) aryl having 6 to 10 cyclic carbon atoms (c) C$_1$ to C$_6$ alkylaryl having 6 to 10 cyclic carbon atoms in the aryl portion (d) C$_6$ to C$_{10}$ aralkyl having 1 to 20 carbon atoms in the alkyl portion (e), radicals of (a) bearing a substituent group selected from cyano, methoxy, acetamido and carboethoxy and (f) 5 to 6 membered heterocyclic groups having 1 to 2 atoms selected from the group consisting of oxygen and nitrogen and R$^1$ is a radical selected from the group consisting of (g) divalent C$_1$ to C$_6$ alkylene (h) C$_6$ to C$_{10}$ arylene (i) C$_1$ to C$_6$ alkyl arylene having 6 to 10 cyclic carbon atoms (j) C$_6$ to C$_{10}$ aralkylene having 1 to 6 carbon atoms in the alkylene portion (k) C$_3$ to C$_7$ cycloalkyl and (l) C$_3$ to C$_7$ alkylene bearing substituent alkyl groups having 1 to 6 carbon atoms, at a temperature below the decomposition temperature of the reacting ester but above the boiling point of the alcohol produced at reaction pressure, separating the alcohol produced and recovering the glycol bis-carbamate product.

2. The process in accordance with claim 1 in which R$^1$ is ethylene, R is benzyl and the product is ethylene glycol-bis(N-benzylcarbamate).

3. The process which comprises heating 2-hydroxyethyl-N-benzylcarbamate at a temperature of about 125 to 170° C. at subatomspheric pressure and collecting at least one fraction comprising glycol-bis(N-benzylcarbamate).

4. The process which comprises heating N-methyl-2-hydroxypropylcarbamate at a temperature of about 120 to 140° C. at subatmospheric pressure and collecting at least one fraction comprising propylene glycol-bis(N-methylcarbamate).

5. The process which comprises heating N-morpholino-2-hydroxyethyl carbamate at a temperature of about 120° to 150° C. at subatmospheric pressures and collecting at least one fraction comprising glycol-bis(N-morpholino-carbamate).

References Cited
UNITED STATES PATENTS
3,076,007   1/1963   Barclay et al. _____ 260—482

ALEX MAZEL, *Primary Examiner.*
NICHOLAS S. RIZZO, *Examiner.*
J. TOVAR, *Assistant Examiner.*